(12) United States Patent
Abali et al.

(10) Patent No.: US 8,954,683 B2
(45) Date of Patent: Feb. 10, 2015

(54) TRANSLATION TABLE AND METHOD FOR COMPRESSED DATA

(75) Inventors: Bulent Abali, Tenafly, NJ (US); James A. Marcella, Rochester, MN (US); Michael Mi Tsao, Yorktown Heights, NY (US); Steven M. Wheeler, Rochester, MN (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 138 days.

(21) Appl. No.: 13/587,246

(22) Filed: Aug. 16, 2012

(65) Prior Publication Data
US 2014/0052957 A1  Feb. 20, 2014

(51) Int. Cl.
*G06F 12/00* (2006.01)
(52) U.S. Cl.
USPC .......................................... 711/147; 711/161
(58) Field of Classification Search
CPC ............................................... G06F 2212/7205
USPC ......................................... 711/206, 147, 161
See application file for complete search history.

(56) References Cited

U.S. PATENT DOCUMENTS

2009/0287901 A1* 11/2009 Abali et al. .................... 711/206
2010/0042790 A1   2/2010 Mondal et al.
2010/0077013 A1   3/2010 Clements et al.
2010/0121825 A1*  5/2010 Bates et al. .................... 707/692
2010/0281208 A1  11/2010 Yang
2011/0082998 A1   4/2011 Boldy et al.
2012/0016882 A1*  1/2012 Tofano .......................... 707/747

OTHER PUBLICATIONS

Tremaine et al., IBM Memory Expansion Technology (MXT), IBM J. Res. & Dev., vol. 45 No. 2 Mar. 2001.
Nicol, David M.et al.; "Dynamic Remapping of Parallel Computations with Varying Resource Demands"; http://www.ip.com/pubview/IPCOM000149184D; Apr. 13, 2007.
Saltz, Joel H. et al.; "Statistical Methodologies for the Control of Dynamic Remapping"; http://www.ip.com/pubview/IPCOM000149185D; Apr. 13, 2007.

* cited by examiner

*Primary Examiner* — Gurtej Bansal
(74) *Attorney, Agent, or Firm* — Katherine S. Brown; Jeffrey L. Streets

(57) ABSTRACT

A translation table has entries that each include a share bit and a delta bit, with pointers that point to a memory block that includes reuse bits. When two translation table entries reference identical fragments in a memory block, one of the translation table entries is changed to refer to the same memory block referenced in the other translation table entry, which frees up a memory block. The share bit is set to indicate a translation table entry is sharing its memory block with another translation table entry. In addition, a translation table entry may include a private delta in the form of a pointer that references a memory fragment in the memory block that is not shared with other translation table entries. When a translation table has a private delta, its delta bit is set.

11 Claims, 5 Drawing Sheets

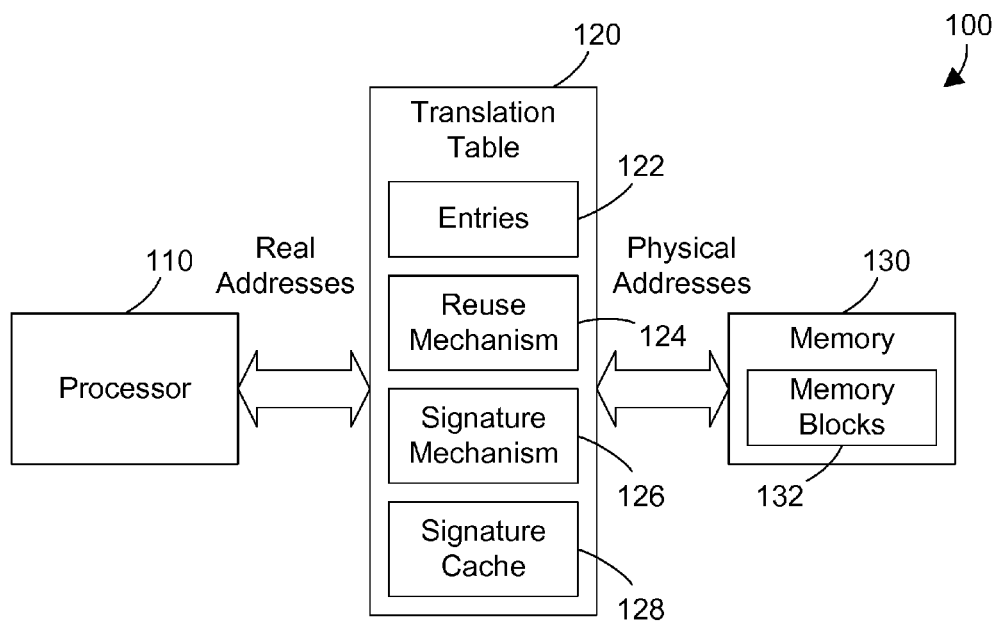
FIG. 1
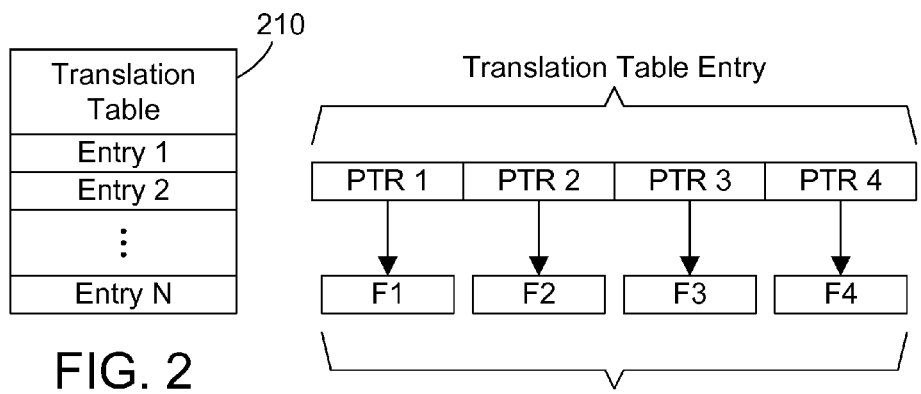
FIG. 2
Prior Art
FIG. 3   Prior Art

TRANSLATION TABLE AND METHOD FOR COMPRESSED DATA

BACKGROUND

1. Technical Field

This disclosure generally relates to data compression, and more specifically relates to storage or memory management of computer systems that support data compression.

2. Background Art

Compressed storage and memory subsystems are known in the art that include translation tables that translate real processor addresses to physical memory addresses. Known translation tables typically include multiple translation table entries that each include multiple pointers to multiple memory fragments in a memory block. When the processor needs to access the memory, the processor provides a real address, which identifies a translation table entry corresponding to the real address. The translation table entry identifies the physical addresses of the memory block corresponding to the real address provided by the processor. In this manner, address translation is achieved between the processor's real addresses and the memory's physical addresses.

Data compression allows reducing the amount of memory needed to store a particular file or data block in memory. However, even after a data block has been compressed, there may remain multiple identical parts of the data in other blocks of the memory.

BRIEF SUMMARY

A translation table has entries that each include a share bit and a delta bit, with pointers that point to a physical memory block that includes reuse bits. When two translation table entries reference identical fragments in a physical memory block, one of the translation table entries is changed to refer to the same memory block referenced in the other translation table entry, which frees up a memory block. The share bit is set to indicate a translation table entry is sharing its memory block with another translation table entry. In addition, a translation table entry may include one or more pointers that reference fragments in a memory block that are shared with other translation table entries, along with a private delta in the form of a pointer that references a memory fragment in the memory block that is not shared with other translation table entries. When a translation table has a private delta, its delta bit is set. A higher degree of data compression is possible because multiple translation table entries that reference identical or similar memory blocks may reference the same memory block, which frees up memory blocks that would otherwise be occupied.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 1 is a block diagram of a system that includes a translation table that supports data compression;

FIG. 2 is a block diagram of a prior art translation table;

FIG. 3 is a block diagram of a prior art translation table entry that points to fragments in a memory block;

DETAILED DESCRIPTION

Figure 4:
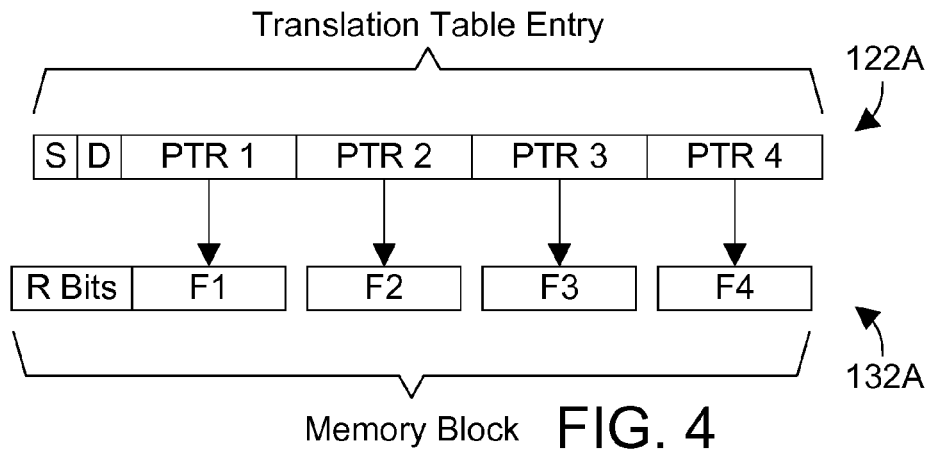
FIG. 4 is a block diagram of a translation table entry that includes a share bit and a delta bit, and a memory block that includes reuse bits.

The claims and disclosure herein provide a translation table with entries that each include a share bit and a delta bit, with pointers that point to a memory block that includes reuse bits. When two translation table entries reference identical fragments in a memory block, one of the translation table entries is changed to refer to the same memory block referenced in the other translation table entry, which frees up a memory block. The share bit is set to indicate a translation table entry is sharing its memory block with another translation table entry. In addition, a translation table entry may include one or more pointers that reference fragments in a memory block that are shared with other translation table entries, along with a private delta in the form of a pointer that references a memory fragment in the memory block that is not shared with other translation table entries. When a translation table has a private delta, its delta bit is set. A higher degree of data compression is possible because multiple translation table entries that reference identical or similar memory blocks may reference the same memory block, which frees up memory blocks that would otherwise be occupied.

Referring to FIG. 1, an apparatus 100 includes a processor 110, a translation table 120, and a memory 130. The processor 110 provides real addresses to the translation table 120, which maps the real addresses to corresponding physical addresses in the memory 130. The memory 130 includes multiple memory blocks 132 that contain data. The translation table 120 includes a plurality of entries 122, a reuse mechanism 124, a signature mechanism 126, and a signature cache 128. The reuse mechanism 124 provides increased data compression by identifying identical or similar memory blocks 132 in the memory 130, then taking action to make multiple translation table entries point to the same data, thus freeing up a memory block. The signature mechanism 126 generates digital signatures for each of the memory blocks 132. The digital signatures are stored in the signature cache 128. The digital signatures allow determining whether two memory blocks are identical or similar by comparing the digital signatures for the two memory blocks. The functions of the reuse mechanism 124 and signature mechanism 126 are discussed in more detail below.

While a specific implementation is shown in FIG. 1 by way of example, the specific implementation in FIG. 1 is in no way limiting to the disclosure and claims herein. For example, the translation table entries 122 could be part of memory 130. The signature cache 128 could also be part of memory 130, or could be in a separate memory. The reuse mechanism 124 and signature mechanism 126 could be implemented within memory 130, or separate from translation table 120 and separate from memory 130. In addition, the memory 130 is representative of any type of storage, including semiconductor memory as well as mass storage such as disk drives. Any suitable arrangement and variation for the concepts presented herein is within the scope of the disclosure and claims.

FIG. 2 shows a prior art translation table 210 that includes multiple entries, shown in FIG. 2 s Entry 1, Entry 2, . . . , Entry N. FIG. 3 shows details of one prior art translation table entry. In the example shown in FIG. 3, the translation table entry includes four pointers PTR 1, PTR 2, PTR 3 and PTR 4 that point to four corresponding memory fragments F1, F2, F3 and F4 that make up a memory block. An unneeded fragment is designated by a zero pointer. Thus, for the example in FIG. 3, if the memory block only includes the first three fragments F1, F2 and F3, the fourth pointer PTR 4 will have a zero value, which indicates the fourth fragment F4 is not needed.

In the prior art, compressing data in a memory can still result in identical data in different memory blocks. The translation table disclosed and claimed herein allows identifying identical and similar memory blocks, and performs actions to cause multiple translation table entries to reference the same memory block, thereby freeing up one or more memory blocks and increasing the efficiency of compression.

Figure 5:
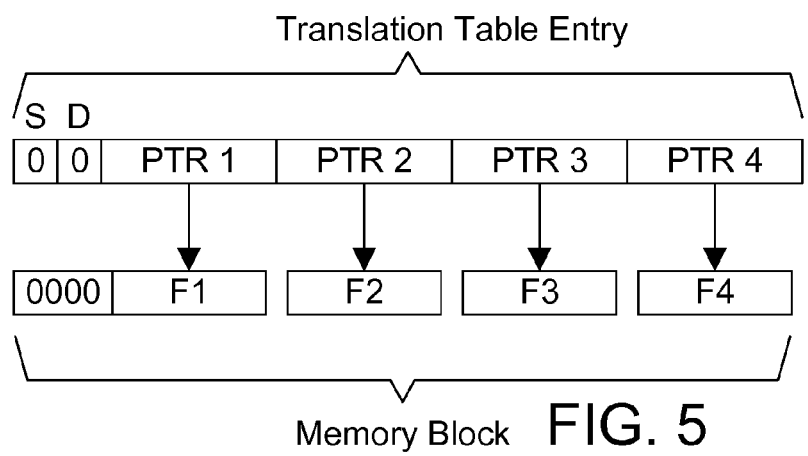
FIG. 5 is a block diagram of a non-shared translation table entry.

Referring to FIG. 4, a translation table entry 122A is an entry 122 in translation table 120 shown in FIG. 1. The translation table entry 122A includes four pointers PTR1, PTR 2, PTR 3 and PTR 4, similar to the prior art translation table entry shown in FIG. 3. However, the translation table entry 122A additionally includes a share bit and a delta bit, shown in FIG. 4 as bits S and D preceding PTR 1. The memory block 132A in FIG. 4 is a memory block 132 in the memory 130 shown in FIG. 1. The memory block 132 includes four fragments F1, F2, F3 and F4, similar to the prior art memory block shown in FIG. 3. In one specific implementation, the memory block comprises a 1 KB block made up of four 256 byte fragments. The memory block 132A in FIG. 4 additionally includes reuse bits denoted R Bits in FIG. 4 that provide a count of the number of times the memory block is reused by translation table entries. In one specific implementation, the reuse bits comprise a four bit counter, which allows each memory block to be reused by up to 16 different translation table entries. Thus, when a memory block is not shared (reused) by any other translation table entry, the count provided by the reuse bits is zero. FIG. 5 shows an example of a translation table entry that has its share bit and delta bit cleared, with a four-bit reuse counter all zeroes indicating the corresponding memory block is not reused (or shared) by any other translation table entry. The reuse bits allow determining whether fragments in a memory block may be freed up when a translation table entry no longer references the memory block. When the reuse bits indicate no other translation table entry references the memory block, when the translation table entry that references the memory block no longer needs the memory block, the memory block may be freed up. However, when the reuse bits indicate one or more other translation table entries reference the memory block, when one of the translation table entries that references the memory block no longer needs the memory block, the counter in the reuse bits is decremented by one. When the counter reaches zero, this means no other translation table entries reference the memory block, which means the memory block may be freed up when the translation table entry referencing the memory block no longer needs the memory block.

Figure 6:
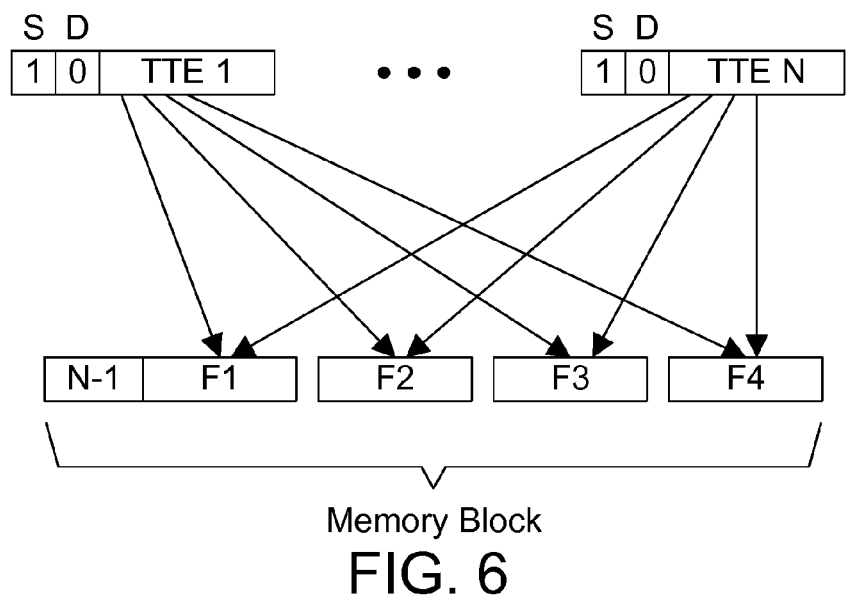
FIG. 6 is a block diagram showing N translation table entries that share a single memory block.

FIG. 6 is a graphical representation when multiple translation table entries reference the same memory block. The example in FIG. 6 assumes there are N translation table entries, shown in FIG. 10 as TTE 1, . . . , TTE N, that all reference the same memory block. In this case, the reuse bits in the memory block are set to the number N−1, which indicates that N translation table entries share the memory block. Note that when only one translation table points to the memory block, the reuse bits will have a value of zero. The reuse bits thus indicate a count of a number of translation table entries that share a memory block, because the count may be easily determined from the numerical indication provided by the reuse bits. Thus, when the reuse bits have a value of three, this indicates that four different translation table entries share the corresponding memory block. As described above, when a translation table entry no longer needs to reference a memory block, a determination may be made by examining the reuse bits of the memory block whether the memory block may be freed up or not. When the reuse bits have a value of zero, the memory block may be freed up. When the reuse bits have a non-zero value, the memory block may not be freed up because another translation table entry still references the memory block.

Figure 7:
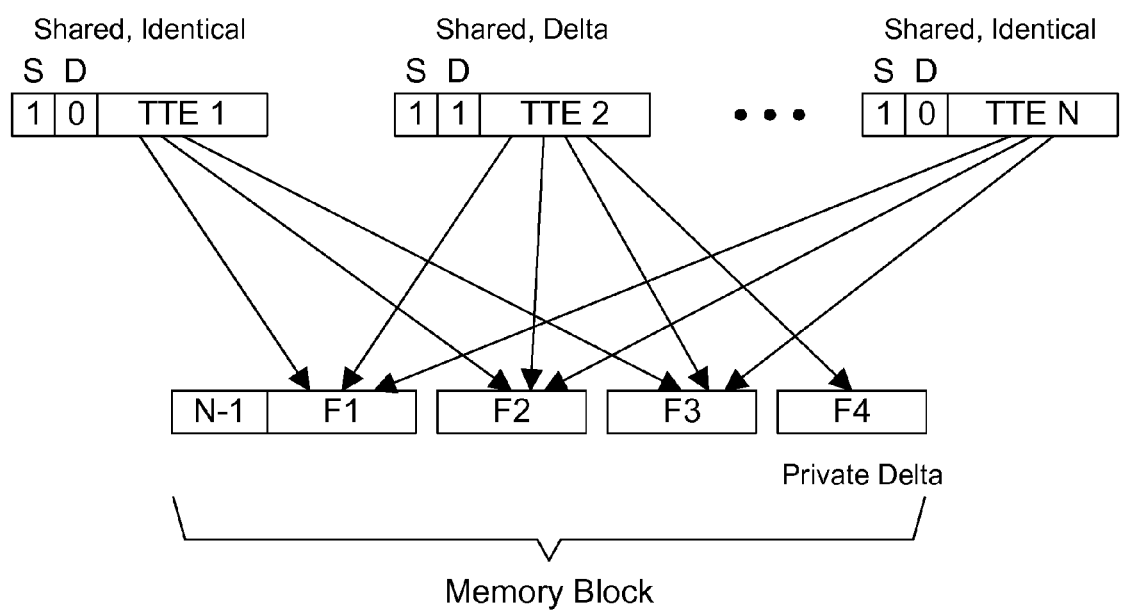
FIG. 7 is a block diagram showing N translation table entries that share a single memory block, with one of the translation table entries having a private delta.

There may be a case where a translation table entry shares most of a memory block, while having its own unique portion as well. This case is shown graphically in FIG. 7. There are multiple translation table entries TTE 1, TTE 2, . . . , TTE N that share the first three fragments F1, F2 and F3 of the memory block. However, one of the translation table entries, namely TTE 2, also references fragment 4 of the memory block. This is referred to herein as a "private delta", meaning the data that differs from other translation table entries is private to TTE 2. Because TTE 2 in FIG. 7 has a private delta as shown, TTE 2 is shown with its delta bit set. Note the reuse bits in the memory block still indicate N−1 different translation table entries share the memory block because the reuse bits count translation table entries as sharing the memory block regardless of whether the translation table entry has a private delta or not.

Figure 8:
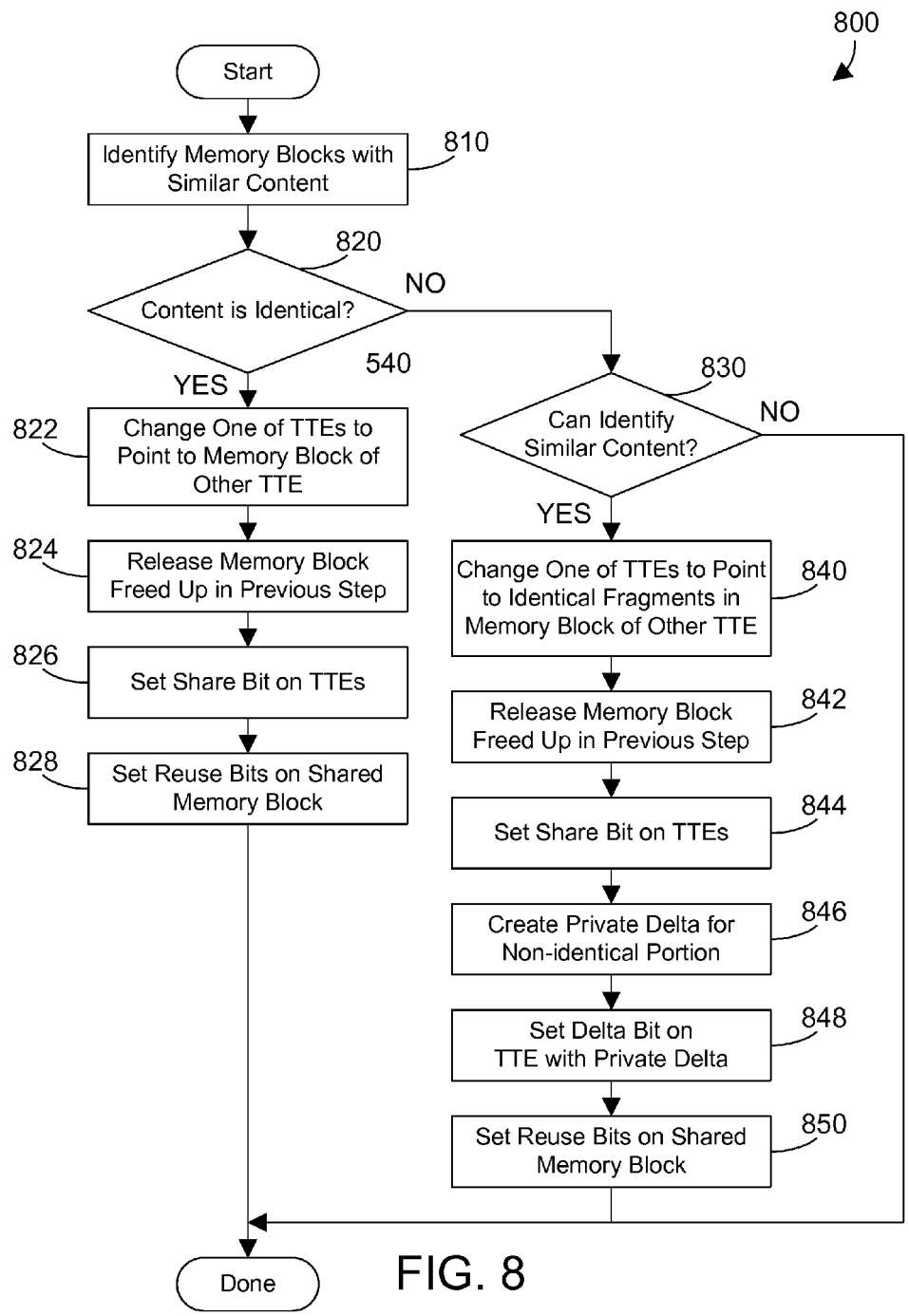
FIG. 8 is a flow diagram of a method for compressing data in memory.

Referring to FIG. 8, a method 800 is preferably performed by the reuse mechanism 124 shown in FIG. 1. Memory blocks with similar content are identified (step 810). When the content is identical (step 820=YES), one of the translation table entries that points to one of the memory blocks is changed to point to the memory block referenced by the other translation table entry (step 822). As a result, the memory block that was previously referenced is freed up. The memory block freed up as a result of performing step 822 is then released (step 824). The share bit on the translation table entries that share the memory block are set (step 826), and the reuse bits on the shared memory block are set (step 828) to indicate that the shared memory block is shared (or reused). When the content in translation table entries is similar but not identical (step 820=NO), when the similar content cannot be identified (step 830=NO), method 800 is done. When the similar content can be identified (step 830=YES), one of the translation table entries is changed to point to one or more identical fragment (s) in the memory block of the other translation table entry (step 840). The memory block freed up as a result of performing step 840 is then released (step 842). The share bit on the translation table entries that share the memory block are set (step 844). A private delta is then created for the non-identical portion (step 846). The delta bit is set on the translation table entry with the private delta (step 848). The reuse bits on the shared memory block are then set (step 850) to indicate that the shared memory block is shared (or reused). Method 800 is then done.

Figure 9:
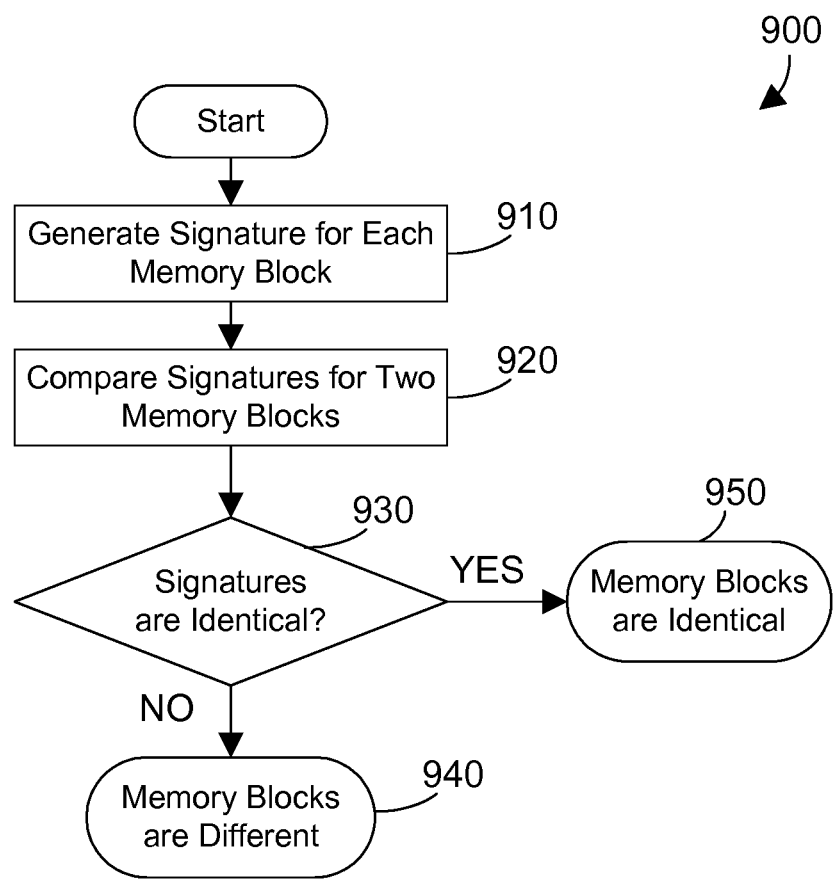
FIG. 9 is a flow diagram of a method for determining whether memory blocks are identical or not.

Determining when memory blocks are identical in step 820 and when similar content can be identified in step 830 may be performed in any suitable way. One possible way is shown in method 900 in FIG. 9. A digital signature is generated for each memory block (step 910). The digital signatures are stored in a signature cache 128 as shown in FIG. 1. The signatures for two memory blocks are then compared (step 920). When the signatures are identical (step 930=YES), the memory blocks are identical (step 950). When the signatures are not identical (step 930=NO), the memory blocks are different (step 940). Method 900 thus shows one suitable way to identify memory blocks with identical content (step 820=YES).

The translation table described and claimed herein has entries that each include a share bit and a delta bit, with pointers that point to a memory block that includes reuse bits. When two translation table entries reference identical fragments in a memory block, one of the translation table entries is changed to refer to the same memory block referenced in the other translation table entry, which frees up a memory block. The share bit is set to indicate a translation table entry is sharing its memory block with another translation table entry. In addition, a translation table entry may include one or more pointers that reference fragments in a memory block that are shared with other translation table entries, along with a private delta in the form of a pointer that references a memory fragment in the memory block that is not shared with other translation table entries. When a translation table has a private delta, its delta bit is set. A higher degree of data compression is possible because multiple translation table entries that reference identical or similar memory blocks may reference the same memory block, which frees up memory blocks that would otherwise be occupied.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. An apparatus comprising:
    a memory having a plurality of memory blocks; and
    a translation table having a plurality of translation table entries, each translation table entry having a share bit and a plurality of pointers that each point to a memory fragment in a memory block in the memory, wherein the share bit is set on a first translation table entry when the first translation table entry includes at least one pointer that points to a memory fragment in the memory block that is shared with a second translation table entry, wherein each translation table entry includes a delta bit, wherein first and second translation table entries each have the share bits set and delta bits cleared when the first and second translation table entries have all pointers that point to memory fragments that are all shared by the first and second translation table entries, and wherein the first and second translation table entries each have the share bit set and the first translation table entry has the delta bit set when the first translation table entry includes at least one pointer that points to a memory fragment in the memory block that is shared with the second translation table entry and when the first translation table entry includes at least one pointer that points to a different memory fragment in the memory block that is not shared, wherein the first and second translation table entries each have the share bit cleared and the delta bit cleared when the plurality of pointers in the first translation table entry point to different memory blocks than the plurality of pointers in the second translation table entry.

2. The apparatus of claim 1 wherein the share bit on the first translation table entry is cleared when the first translation table entry does not share any memory fragments with any other translation table entry.

3. The apparatus of claim 1 wherein the different memory fragment in the memory block that is not shared comprises a private delta.

4. The apparatus of claim 1 wherein the delta bit on the first translation table entry is cleared when the first translation table entry does not point to a private delta.

5. The apparatus of claim 1 further comprising a reuse mechanism that identifies first and second memory blocks with identical content, changes a translation table entry corresponding to the first memory block to point to at least one memory fragment in the second memory block, releases the first memory block, and sets the share bit of the translation table entries corresponding to the first and second memory blocks.

6. The apparatus of claim 5 further comprising a signature mechanism that generates a digital signature for each of a plurality of memory blocks that include the first and second memory blocks, wherein the reuse mechanism identifies the first and second memory blocks have identical content by comparing a digital signature for the first memory block with a digital signature for the second memory block.

7. The apparatus of claim 1 wherein each memory block comprises a plurality of reuse bits indicating a number of the plurality of translation table entries that share at least one memory fragment in the memory block.

8. The apparatus of claim 7 further comprising a reuse mechanism that identifies first and second memory blocks with identical content, changes a translation table entry corresponding to the first memory block to point to at least one memory fragment in the second memory block, releases the first memory block, sets the share bit of the translation table entries corresponding to the first and second memory blocks, and sets the reuse bits in the second memory block to indicate the number of the plurality of translation table entries that share the at least one memory fragment in the memory block.

9. The apparatus of claim 8 further comprising a signature mechanism that generates a digital signature for each of a plurality of memory blocks, wherein the reuse mechanism identifies the first and second memory blocks have identical content by comparing a digital signature for the first memory block with a digital signature for the second memory block.

10. An apparatus comprising:
    a memory having a plurality of memory blocks, each memory block comprising a plurality of reuse bits indicating reuse of the memory block;
    a translation table having a plurality of translation table entries, each translation table entry having a share bit, a delta bit, and a plurality of pointers that each point to a memory fragment in a memory block, wherein the share bit is set on a first translation table entry when the first translation table entry includes at least one pointer that points to a memory fragment in the memory block that is shared with a second translation table entry, wherein the share bit on the first translation table entry is cleared when the first translation table entry does not share any memory fragments with any other translation table entry, wherein the delta bit on the first translation table entry is set when the first translation table entry includes at least one pointer that points to the memory fragment in the memory block that is shared with the second translation table entry and when the first translation table entry includes at least one pointer that points to a different memory fragment in the memory block that is not shared with the second translation table entry, wherein the different memory fragment in the memory block that is not shared comprises a private delta, wherein the delta bit is cleared on the first translation table entry when the first translation table entry does not point to a private delta;

a reuse mechanism that identifies first and second memory blocks with identical content, the first and second memory blocks having corresponding first and second translation table entries, changes the first translation table entry to point to at least one memory fragment in the second memory block, releases the first memory block, sets the share bit of the first and second translation table entries, and sets the reuse bits in the second memory block to indicate a number of the plurality of translation table entries that share the second memory block;

a signature mechanism that generates a digital signature for each of the plurality of memory blocks, wherein the reuse mechanism identifies the first and second memory blocks have identical content by comparing a digital signature for the first memory block with a digital signature for the second memory block.

11. An apparatus comprising:

a memory having a plurality of memory blocks, each memory block comprising a plurality of reuse bits indicating reuse of the memory block;

a translation table having a plurality of translation table entries, each translation table entry having a share bit, a delta bit, and a plurality of pointers that each point to a memory fragment in a memory block in the memory, wherein the share bit is set on a first translation table entry when the first translation table entry includes at least one pointer that points to a memory fragment in the memory block that is shared with a second translation table entry, wherein the first and second translation table entries each have the share bits set and delta bits cleared when the first and second translation table entries have all pointers that point to memory fragments that are all shared by the first and second translation table entries, and wherein the first and second translation table entries each have the share bit set and the first translation table entry has the delta bit set when the first translation table entry includes at least one pointer that points to a memory fragment in the memory block that is shared with the second translation table entry and when the first translation table entry includes at least one pointer that points to a different memory fragment in the memory block that is not shared, wherein the first and second translation table entries each have the share bit cleared and the delta bit cleared when the plurality of pointers in the first translation table entry point to different memory blocks than the plurality of pointers in the second translation table entry;

generating a digital signature for each of the plurality of translation table entries, wherein the digital signature for a selected translation table entry comprises a hash value computed for a tile of bytes of the selected translation table entry, wherein the tile of bytes comprises a subset of contiguous bytes of the selected translation table entry;

identifying third and fourth memory blocks with identical content by comparing a digital signature for the third memory block with a digital signature for the fourth memory block, wherein the third and fourth memory blocks have corresponding third and fourth translation table entries;

changing the third translation table entry corresponding to the third memory block to point to at least one memory fragment in the fourth memory block;

releasing the third memory block;

setting the share bit of the third and fourth translation table entries;

clearing the share bit on the third translation table entry when the third translation table entry does not share any memory fragments with any other translation table entry;

clearing the share bit on the fourth translation table entry when the fourth translation table entry does not share any memory fragments with any other translation table entry;

setting the delta bit on the third translation table entry when the third translation table entry includes at least one pointer that points to the memory fragment in the memory block that is shared with the fourth translation table entry and when the third translation table entry includes at least one pointer that points to a different memory fragment in the memory block that is not shared, wherein the different memory fragment in the memory block that is not shared comprises a private delta;

clearing the delta bit on the third translation table entry when the third translation table entry does not point to a private delta; and setting the reuse bits in a memory block shared by the third and fourth translation table entries to indicate a number of the plurality of translation table entries that share the at least one memory fragment in the memory block.

* * * * *